United States Patent
Baumann

(10) Patent No.: US 8,336,254 B2
(45) Date of Patent: *Dec. 25, 2012

(54) MOULDED BODY FOR IMPROVING CULTIVATION CONDITIONS FOR PLANTS

(75) Inventor: Gerhard Baumann, Ittigen (CH)

(73) Assignee: IUP Institut fur Umweltpflege AG, Ittigen (CH)

(*) Notice: Subject to any disclaimer, the term of this patent is extended or adjusted under 35 U.S.C. 154(b) by 1417 days.

This patent is subject to a terminal disclaimer.

(21) Appl. No.: 11/296,405

(22) Filed: Dec. 8, 2005

(65) Prior Publication Data

US 2006/0107593 A1    May 25, 2006

Related U.S. Application Data

(62) Division of application No. 10/433,055, filed on May 30, 2003, now Pat. No. 7,000,351.

(30) Foreign Application Priority Data

Dec. 4, 2000 (CH) .................................. 2352/00

(51) Int. Cl.
*A01G 25/00* (2006.01)
(52) U.S. Cl. .......... 47/80; 47/32.7; 47/64; 47/71; 47/79; 47/65.5
(58) Field of Classification Search ............. 47/71, 64, 47/63, 65, 65.5, 66.2, 79, 80
See application file for complete search history.

(56) References Cited

U.S. PATENT DOCUMENTS

| | | | |
|---|---|---|---|
| 1,250,875 A * | 12/1917 | Heuchan | 450/38 |
| 1,775,831 A | 9/1930 | Salisbury | |
| 1,992,878 A * | 2/1935 | Muller | 47/80 |
| 2,130,234 A * | 9/1938 | Haglund | 47/80 |
| 2,191,545 A * | 2/1940 | Schneider | 450/40 |
| 2,691,245 A | 10/1954 | Yohe | |
| 2,791,347 A | 5/1957 | Boehm | |
| 2,834,153 A | 5/1958 | Fearn | |
| 2,837,869 A | 6/1958 | Chatten | |
| 3,151,415 A | 10/1964 | James | |
| 3,381,410 A | 5/1968 | Potain | |
| 3,739,523 A | 6/1973 | Tuffli | |
| 3,821,863 A | 7/1974 | Chan | |
| 3,830,015 A | 8/1974 | Belgiorno | |
| 3,866,351 A * | 2/1975 | Cobia | 47/81 |
| 4,037,363 A * | 7/1977 | Baumann | 47/59 R |
| 4,117,632 A | 10/1978 | Pearce | |
| 4,268,992 A * | 5/1981 | Scharf, Sr. | 47/32.4 |
| 4,361,983 A | 12/1982 | Wilson | |
| 4,499,686 A | 2/1985 | Scragg | |

(Continued)

FOREIGN PATENT DOCUMENTS

DE    35 10 513    9/1986

(Continued)

Primary Examiner — Andrea Valenti
(74) Attorney, Agent, or Firm — Young & Thompson

(57) ABSTRACT

A molded body for improving the cultivating conditions of plants includes at least one tapering projection. The molded body is disposed such that the projection extends into a plant substrate from the bottom. The projection is a highly porous material for providing an exchange of water by capillary forces and/or air, between the interior and the area surrounding the projection. The molded body comprises a depression provided opposite the projection and serving as a water reservoir that is spaced apart from the plant substrate.

3 Claims, 7 Drawing Sheets

U.S. PATENT DOCUMENTS

| | | | |
|---|---|---|---|
| 4,735,016 A * | 4/1988 | Hougard | 47/80 |
| 5,136,806 A * | 8/1992 | Kang | 47/81 |
| 5,189,835 A * | 3/1993 | Green | 47/80 |
| 5,247,762 A | 9/1993 | Green | |
| 5,692,338 A | 12/1997 | Rose | |
| 5,884,431 A | 3/1999 | Byk | |
| 6,079,156 A * | 6/2000 | Colovic | 47/81 |
| 6,370,819 B1 | 4/2002 | Reiss et al. | |
| 6,691,456 B2 * | 2/2004 | Vahrmeyer | 47/66.2 |
| 7,000,351 B2 * | 2/2006 | Baumann | 47/80 |
| 2002/0174599 A1 | 11/2002 | Rose | |
| 2006/0037241 A1 * | 2/2006 | Orschulik | 47/65.5 |

FOREIGN PATENT DOCUMENTS

| | | | |
|---|---|---|---|
| EP | 0 390 948 | | 10/1990 |
| EP | 0 865 725 | | 9/1998 |
| FR | 2659191 A | | 3/1990 |
| FR | 2 766 327 | | 1/1999 |
| GB | 1479695 | * | 7/1977 |
| JP | 407147851 A | | 11/1993 |
| JP | 09065766 A | * | 3/1997 |
| WO | WO 00/10379 | * | 3/2000 |

* cited by examiner

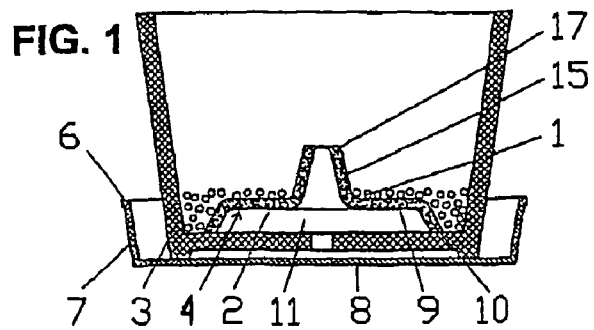
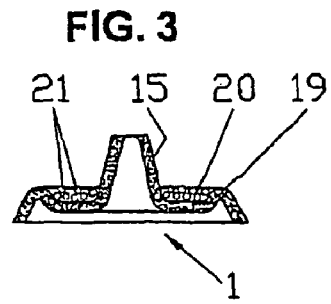
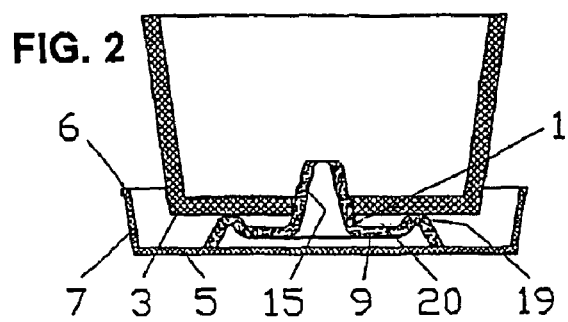
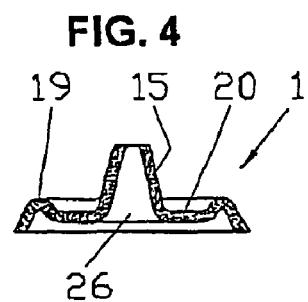
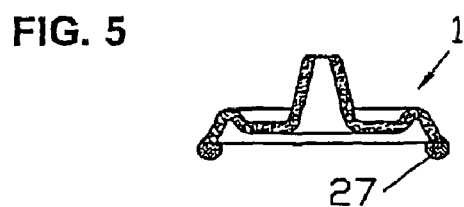
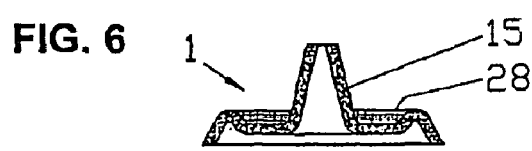
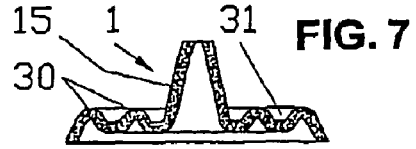
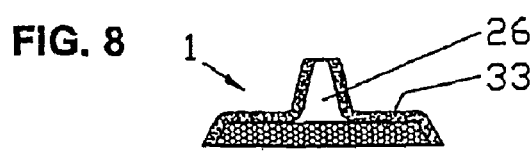
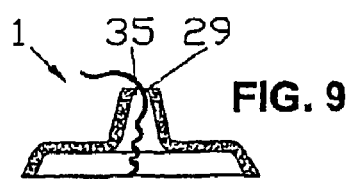
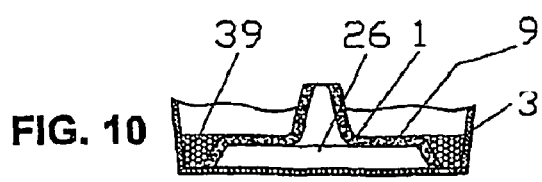

MOULDED BODY FOR IMPROVING
CULTIVATION CONDITIONS FOR PLANTS

This application is a continuation-in-part of co-pending application Ser. No. 10/433,055, filed on May 30, 2003. application Ser. No. 10/433,055 is the national phase of PCT International Application No. PCT/CH01/00695 filed on Dec. 3, 2001 under 35 U.S.C. §371, which claims priority of Swiss Application No. 2352/00 filed Dec. 4, 2000. The entire contents of each of the above-identified applications are hereby incorporated by reference.

BACKGROUND OF THE INVENTION

The present invention refers to a moulded body for improving the cultivating conditions of plants.

It is known that the roots of plants in containers of all kinds, particularly in planting pots, mainly develop in the lower border areas and at the bottom of the containers. A dense mat of roots develops if the plants are not repotted in time. Later on, the roots will spread into the inner area of the root ball, thereby thickening the entire root ball, particularly of quickly growing plants. The following problems are the result:

poor and/or irregular distribution of the water or nutrient solution;
formation of cracks and channels between the root ball and the walls of the pot, causing a one-sided water drain and an insufficient water supply in portions of the root ball;
quick drying-out of the entire root ball;
deficiency symptoms of the plants;
dying plants;
if the water is poured into a saucer or a cachepot of the planting container, only the lower portion of the root ball is supplied where the densest root mat is located. If the water remains in the saucer for a long time, the still intact and healthy roots will start to rot. The consequences are damages of the roots and plants that may lead to complete decay.

Plants having a low water consumption, e.g. indoor plants in shady places, are often watered excessively and thereby virtually drowned. Most indoor plants mainly suffer from too frequent watering and too short watering intervals, so that the root ball cannot start drying or dry out. The results are oxygen deficiency and over-acidification of the substrate in soil cultures.

Further problems resulting from the compacting of the root ball under these conditions are the development of phytotoxic substances, pest infestations and fungous diseases on roots and plants, dropping leaves, decay of plant parts or of the entire plant.

Especially with potted plants, the planting container is often too small and there is not enough room for the roots of the plant. Normal watering from above results in superficial mudding, the wettability of the plant substrate (soil) decreases, and the water will preponderantly run down between the planting container and the substrate without penetrating into the substrate. The results are nutrient and water deficiency and thus growth depressions, dropping leaves, pest infestations and diseases due to reduced resistance, and decay of parts or of entire plants.

Planting containers of all kinds are mostly provided with so-called drainage holes for excess water to flow off, the water having absorbed nutrients in most cases. On one hand, this leads to nutrient losses, and on the other hand, facades and floors are soiled by the drained unclean water.

For a controlled or economical watering, the following systems are known:

inserts forming reservoirs;
capillary wicks, mats, fleeces etc.;
drip watering;
water containers that are insertable from the top, the portion inserted in the plant substrate being porous to allow the penetration of water, and the water supply being stored in a container located above this portion or just in the insert itself.

Remaining drawbacks of these systems are:
irregular moisture supply;
deficient or poor aeration of the root ball;
choking and/or mudding after prolonged use of the capillary systems (wicks, fleeces, burnt clays [too fine pored]), particularly due to calciferous water and efflorescence;
labour-intensive production and complicated application;
unattractive design;
demanding logistics;
unfavorable price-performance ratio.

SUMMARY OF THE INVENTION

Therefore, it is an object of the present invention to provide a moulded body for improving the cultivating conditions of plants that allows an improved supply of roots, especially by water and/or air, also in the case of compacted roots.

Another object consists in providing a design of the moulded body that allows its combination with known plant containers.

One of the main aspects of the invention consists in placing a moulded body in a planting container. The moulded body is provided with a preferably conical projection extending into the interior of the planting container, i.e. into the plant substrate and thus into the root ball. The apex of the projection and/or its envelope are provided with apertures allowing the penetration of water or air from the interior of the moulded body into the plant substrate. At the lower end of the projection the base is provided, which has essentially the form of a flat portion or plate which extends approximately perpendicularly to the projection. In the case of a conical projection, the base may e.g. be in the form of a ring connected to the foot of the projection. On the other side of the base, e.g. at the rim, a lip is provided, thereby delimiting an area on this side of the base in the manner of a wall and thus delimiting a depression on this side of the base.

Hence, in the simplest case, the moulded body resembles a sombrero where the rim of the base comprises a downwardly projecting collar.

In an alternative embodiment, the watering effect near the surface is promoted by the fact that the conical projection is almost or entirely water-impermeable near the top, whereas it is water-permeable and/or provided with holes at the lower, wider end. This body is intended for being inserted in the plant substrate from above with the apex extending downwards, whereby the apex forms a water reservoir while water may exit at the lower end of the projection, i.e. near the surface of the plant substrate.

Alternatively or additionally, the moulded body is made from a water-permeable material, e.g. of clay, so that a liquid exchange through the material and within the material is possible.

The conical shape is advantageous in that a moulded body of this kind can be impressed into the plant substrate with the apex first. At least the portion of the moulded body that is to be inserted into the plant substrate is hollow or made of a material that is capable of absorbing and conducting liquids, e.g. through the capillary effect. This inner space is still accessible for supplying water after the insertion of the moulded body.

BRIEF DESCRIPTION OF THE DRAWINGS

The invention shall be further explained by means of exemplary embodiments and with reference to figures, where FIG. 1 shows a sectional view of a planting container with a moulded body;

FIG. 2 shows a sectional view of a planting container fitted on a moulded body;

FIGS. 3 to 12 show different embodiments of the moulded body in sectional views;

DETAILED DESCRIPTION OF THE PREFERRED EMBODIMENTS

Figure 11:
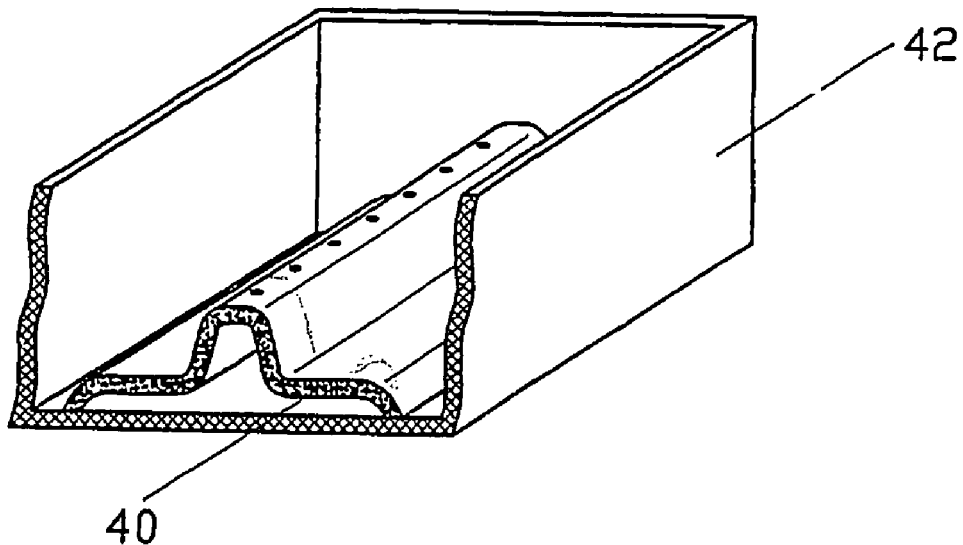

FIGS. 1 and 2 show a moulded body 1 according to the invention in the form of an insert 2 in a planting pot 3 (FIG. 1) and in the form of a support 5, respectively. In both cases, planting pot 1 is placed in a saucer 7. In FIG. 1, the essentially annular base 9 of the moulded body 1 is covered with porous granules 10. Such granular materials are known per se for planting purposes. The layer of granules is a little higher than the upper edge of saucer 7. Thus, the non-represented soil with the root ball contained therein cannot get into direct contact with the water surface in the planting pot as the maximum level is determined by upper edge 6 of saucer 7. The water exchange with saucer 7 is ensured by drainage hole 8.

One characteristic feature is cone 15 extending into the soil. At the apex and/or laterally near the apex, it is provided with apertures 17. These apertures allow the supply of air and/or water from the interior of cone 15 to the root ball near the center thereof, but also the discharge of excess water.

Furthermore, the moulded body is made of a porous, water-conducting material. Therefore, water is conducted to the apex by capillary forces, and an exchange both of water and air is possible through the walls of cone 15 as well as through base 9. The base 9 has a convex portion 4 that defines a cavity 11 therein. The convex portion 4 faces a direction opposite to that of the cone 15 and is open to the proximal end of the cone 15. The convex portion 4 forms a fluid reservoir. Thus, the moulded body also provides a certain storage capacity for water and nutrients.

A particularly suitable material for moulded body 1 is burnt clay that is as porous as possible.

Tests have shown that the material of the moulded body becomes impermeable to water in a relatively short time if the porosity is insufficient. Besides lime deposits, additives in the water such as nutrients may be deposited. Thus, a sufficient high porosity ensures the function of the moulded body for prolonged periods. Methods for adjusting the porosity are known to those skilled in the art.

The single moulded body 2 is basically suitable also for an attachment to a planting pot 3 from below. Moulded body 5 illustrated in FIGS. 2 and 3 comprises an additional annular ridge 19 on the circumference of base 9, thereby creating an annular trough 20 around cone 15. This trough forms a first water reservoir that is directly accessible to the roots. Excess water simply flows down along the outside of cone 9, is collected in trough 20 and may gradually flow back into pot 3.

The saucer may also be in the form of a trough disposed inside the planting pot, the moulded body being placed on top of the trough.

All in all, the following advantages are obtained:
increased cultivating safety;
no rotting in the lower root area;
no washout of nutrients due to the water and nutrient storage inter alia in water-storing cone 9;
improved distribution of the roots in the root ball (soil ball) due to the regular water and nutrient distribution, especially through the apex of cone 9;
an additional closure of the drainage holes in the bottom of planting pots (e.g. by means of clay pieces) is no longer required;
improved growth of roots and plants;
moulded bodies are stackable for storage;
longer repotting and watering intervals.

Hereinafter, some advantageous variants and modes of application of the moulded body will be given:

According to FIG. 3, a granular material 21 or another absorbent material may be filled into trough 20. As shown in FIG. 4, the space 26 below moulded body 1 also acts as a reservoir. This space allows the insertion e.g. of a slow-release nutrient capsule, thereby ensuring a continuous, long-lasting nutrient supply. FIG. 5 shows a third variant where an elastic, water-permeable hoop or ring 27, e.g. in the form of sponge, is provided at the edge of the base and prevents that granules or soil penetrate into the reservoir underneath the moulded body. At the same time, excess water is immediately conducted into moulded body 1.

FIGS. 6 and 7 show embodiments having cones 15 of increasing height. These extend far into the interior also of tall planting containers where they ensure aeration and water supply. On the other hand, however, the increasing risk of ruptures of the cone, especially at the apex, will be taken into account by an appropriate design and choice of materials.

In the embodiment according to FIG. 6, a fleece or watering mat 28 is placed on base 9. This is necessary especially for moulded bodies made of synthetic material or generally of non-capillary materials to ensure the conduction of water from the base to the apex of the cone. According to FIG. 7, base 9 comprises two annular ridges 30. These provide a better support of a planting container fitted on moulded body 1 while simultaneously forming a water reservoir 31 that is somewhat smaller than in FIG. 2.

In FIG. 8, a water-retaining sponge 33 is inserted in cavity 26. In the embodiment according to FIG. 9, the apex of the cone is provided with an enlarged opening 35 for the insertion e.g. of a wick 29, of a capillary, absorbent plastics element, or of a sponge (not shown) for the conduction of water.

According to FIG. 10, a capillary moulded body 39, e.g. a sponge, may be inserted in the space 38 between base 9 and the wall of planting container 3 in order to store water and to prevent that soil may penetrate into the reservoir (the "wet zone"). The capillary body may also be placed under the rim of the moulded body. In this case, it provides a sealing of cavity 26 that results in a slower draining especially of water from the plant substrate. Moreover, the capillary body improves the transporting and storage properties as it protects the lower edge of the moulded body from shocks.

The moulded body itself is preferably made of highly porous burnt clay having a relatively high water conduction, permeability, and storage capacity. Important parameters regarding the properties of the clay material are the burning duration, the burning method and the burning temperature. The material of the moulded body, particularly clay, may additionally be mixed with porosity-increasing substances such as perlite, pumice, wood dust, or sawdust.

Also possible are e.g. clays having a high cation exchanging capacity such as zeolites, particularly for the purpose of storing nutrients and releasing them over prolonged periods.

However, the moulded body may also be made of less porous clay as it is currently used for flower pots, or else of synthetic materials. Particularly in the latter case, the moulded bodies must be provided with apertures for the passage of water and air. Generally, in highly porous moulded bodies, an additional passage through apertures near the apex of the cone is only required for aeration.

Especially when plastics materials are used, the upper side and/or the underside, i.e. essentially the cavity 26 of the base, as well as the inside of the cone may be provided with a water-conducting layer in order to ensure the transport of water to the cone and along the latter. This may be a glued-on mat, but sprayed-on materials are possible as well.

Instead of the cone, projections of other shapes are conceivable too. However, a somehow conical shape is preferable for the insertion into the plant substrate. The conical shape also provides stackability and may serve as a handle for the insertion in and the removal from planting containers.

FIG. 11 shows an elongated embodiment 40 that is particularly suitable for insertion in rectangular planting boxes 42.

Instead of a separate body, moulded body 40 may also be formed as an integral component of box 42, i.e. the moulded body simultaneously constitutes the bottom of box 42.

Figure 12:
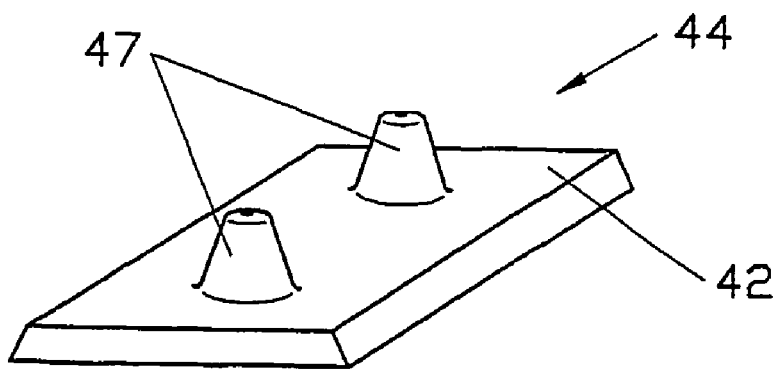

FIG. 12 shows a ninth embodiment 44 with a rectangular base 45 on which two cones 47 are formed. This embodiment is intended particularly for applications in bonsai planting containers and reduces the high burden of cultivation. At the same time, it provides increased safety with regard to insufficient or excessive watering, to which especially bonsai plants are very sensitive.

Figure 13:
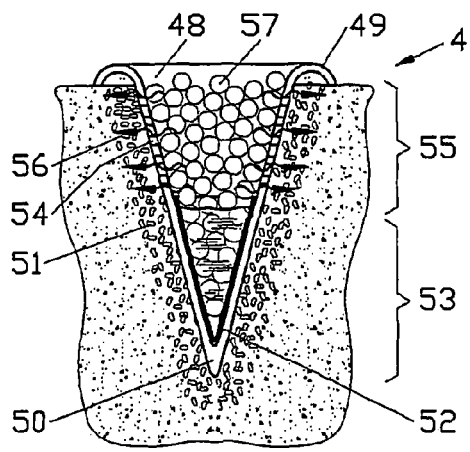
FIGS. 13 to 15 show sectional views of moulded bodies intended for insertion from above.

FIG. 13 shows a tenth embodiment of a moulded body 46 that is designed for being thrust into the plant substrate from above. It is essentially composed of a cone 48 with a collar 49. Cone 48 is almost or perfectly water-impermeable in the area 53 from apex 50 up to about the center in order to form a water reservoir. As it is e.g. made of clay, a water-impermeable insert 52, e.g. of plastics material, is inserted in the lower portion 53. A watertight or water-inhibiting coating is also possible. The sealing layer may also cover the entire internal and/or external surface of moulded body 46. Preferably, it extends over a minimal height of a quarter of the height of moulded body 46. If it is higher than e.g. three quarters of the projection, resp. if it extends over the entire height of the moulded body, the upper area must be provided with apertures 54 allowing the water exchange. Basically, apertures 54 allow the direct distribution of supplied water that is not collected in the reservoir in lower portion 53 to the surrounding plant substrate. Therefore, in this embodiment, they are useful watering aids independently of the material of the moulded body.

This moulded body may also be made of the conventional burnt clay of relatively low porosity as this material will choke in a relatively short time and thus become sufficiently water-impermeable for the purposes of the invention. The water exchange between the reservoir and the plant substrate is ensured by the transport of the water in the reservoir to the water-permeable portion by capillary forces (granular filling; capillary wall material). There, the plant substrate, preferably however a capillary granular material 51, is in direct contact with the capillary material constituting the moulded body itself or contained therein to ensure the water exchange. Therefore, for an optimum effect, the moulded body 46 is embedded in granules 51.

As mentioned, it is possible to provide the sealing means on the outside, whereby the capillary material of moulded body 46 is enabled also to effect the water transport from the reservoir in the lower portion 53 to the exchange area in the upper portion 55 (see below, FIG. 15). Preferably, in this case, a water-impermeable envelope or layer 62 may be provided on the outside in order to prevent the penetration of water in the lower area of the moulded body and thus to achieve a prolonged moisturizing effect through the supply of water in the upper area.

The moulded body may also consist in its entirety of an almost or totally water-impermeable material, e.g. of a plastics material. In this case, the apertures 54 should be provided or other measures should be taken to ensure a liquid exchange in the upper portion 55. Regular clay or materials of similar fine porosity generally exhibit an insufficient permeability, which is soon further reduced by silting or by lime deposits.

Figure 14:
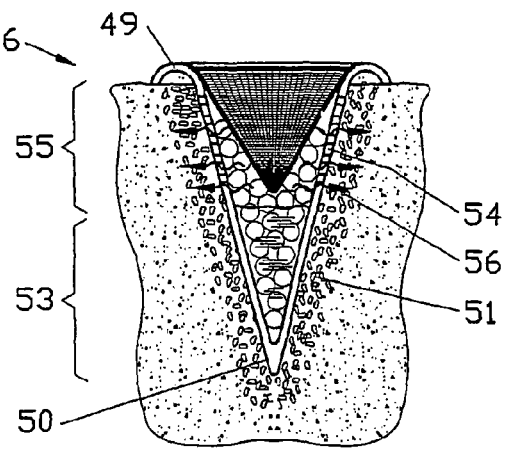

Thus, as illustrated in FIG. 14 by an eleventh embodiment, the water-impermeable lower portion 53 constitutes a reservoir, while in the upper portion 55, the water may pass through apertures 54 (when the moulded body is quite full) and/or through the water-permeable material of moulded body 46 according to arrows 56. When the water level falls below the limit between the water-permeable and the water-impermeable portions, the water supply is ensured by capillary forces. For this purpose, moulded body 46 is filled with porous, capillary granules 57.

The water consumption is thereby reduced, and the water supply is maintained over a longer period. To sustain the water supply in this phase, it is possible to provide capillary systems (wick, sponge) extending e.g. from apex 50 through apertures 54.

This eleventh embodiment comprises a heightened rim 58 to prevent the inflow of surrounding plant substrate during watering. In addition, on the inside, a funnel-moulded sieve insert 59 is provided which, besides preventing the penetration of impurities, also increases the water storage capacity as it forms an internal space that is free of granules.

Figure 15:
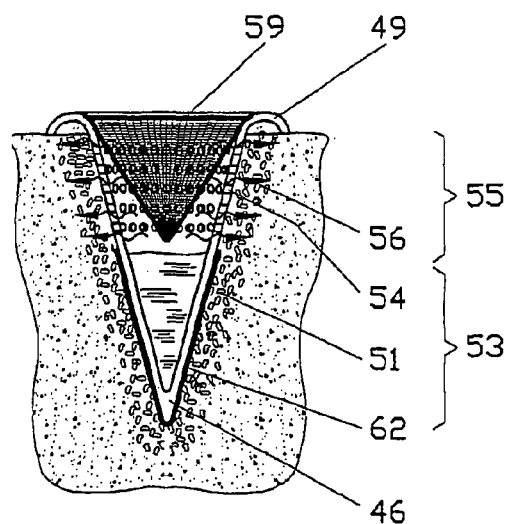

FIG. 15 shows a variant in which the entire moulded body consists of a porous body. The water in the lower area is thus conducted up to the water-permeable section 55 by the walls of moulded body 46, so that a filling with a capillary material is not necessary. In this embodiment, it is also conceivable to use a highly porous material such that the water may penetrate from the moulded body into the plant substrate also in the lower area and, especially if an outer envelope 62 is provided, as represented, an improved water transport to the upper area 55 is ensured. To prevent the entrance of foreign bodies (plant substrate, leaves, etc.), a sieve insert 59 is disposed in the opening of the moulded body.

Figure 16:
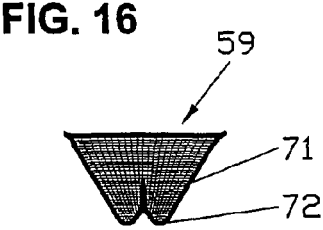
FIG. 16 shows a sectional view of a sieve insert.

A noticeable feature is the alternative sieve insert 70, which is illustrated separately in FIG. 16 for more clarity and may be used instead of sieve insert 59: it is provided with a central projection 71, thereby forming a circular rim 72. Projection 71 may serve as a handle for its removal from moulded body 46, and circular rim 72 allows its placement on a support. All in all, this shape also allows a significant improvement of the stackability.

For a reduced evaporation and a more regular moisture supply, moulded bodies 46 may be filled with clay granules as known for hydroculture, or with other, more particularly water-absorbing, materials.

All in all, the bodies that are thrust into the plant substrate from above provide a loosening effect and constitute a watering aid by conducting the supplied water directly into the plant substrate and additionally storing it temporarily for a sustained supply to the surrounding soil. Inter alia, this prevents that the supplied water flows off on the surface, and by flowing down to apex 50 along the surface of the moulded body, the water is conducted to the interior of the plant substrate and of the root ball.

Amongst others, this arrangement offers the following advantages:
- simplified watering in the case of compacted root balls;
- a more harmonic water distribution;
- additional water storage in the apex of the cone;
- optimum fertilizing effect (also applicable as long-term fertilizer insert)
- additional aeration from above even in the case of a mudded and/or incrusted surface of the plant substrate;
- simple handling;
- advantageous price-performance ratio, simple manufacture;
- improved growth;
- synergies in conjunction with a saucer forming a reservoir and moulded bodies for watering and aeration from below, particularly one of the embodiments according to FIGS. 1 to 12;
- substantially invisible.

Figure 17:
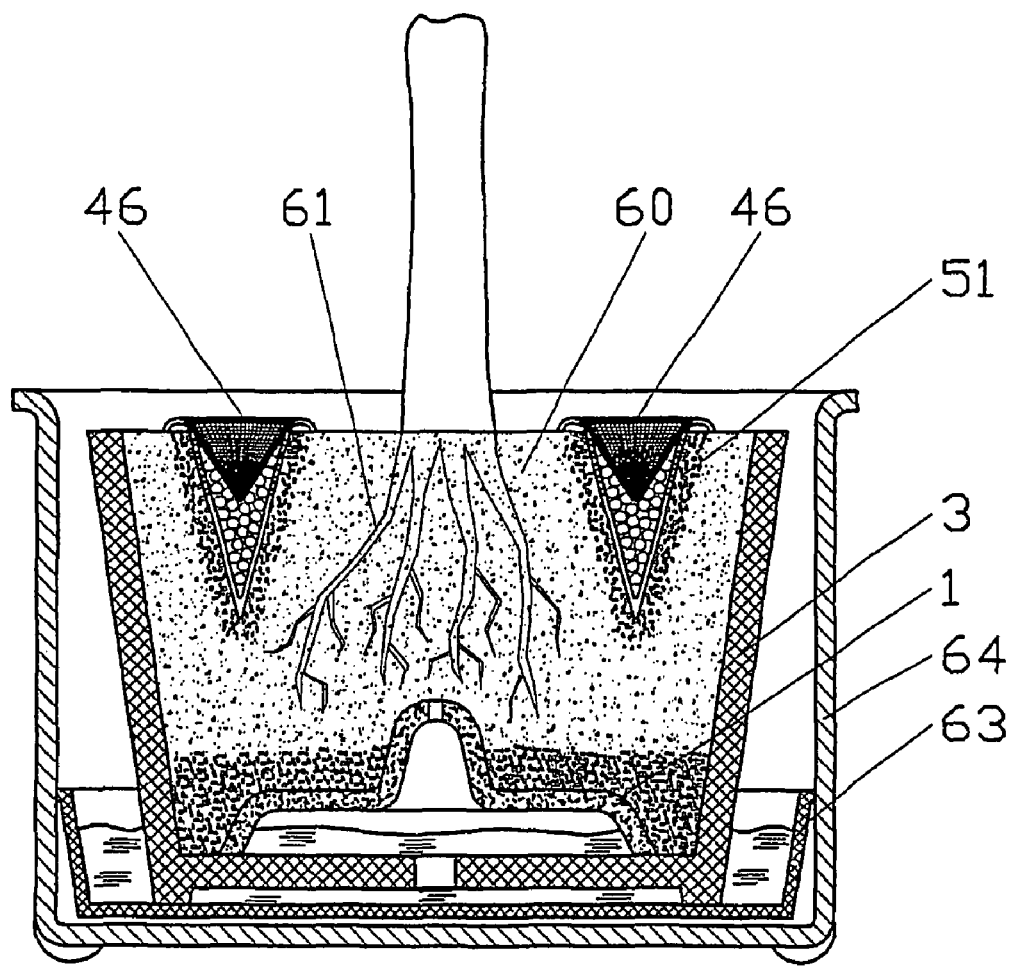
FIG. 17 shows a sectional view of a planting container with moulded bodies at the bottom and inserted from above.

FIG. 17 shows a cross-section of a planting container 3 with a moulded body 1 disposed at the bottom of pot 3 and covered with plant substrate 60, as well as two moulded bodies 46 inserted from above. The improved aeration and water supply result in a more regular growth of roots 61, particularly also more towards the center of the content of the planting container. Planting container 3 rests on a saucer 63, which in turn is disposed in a cachepot 64.

Figure 18:
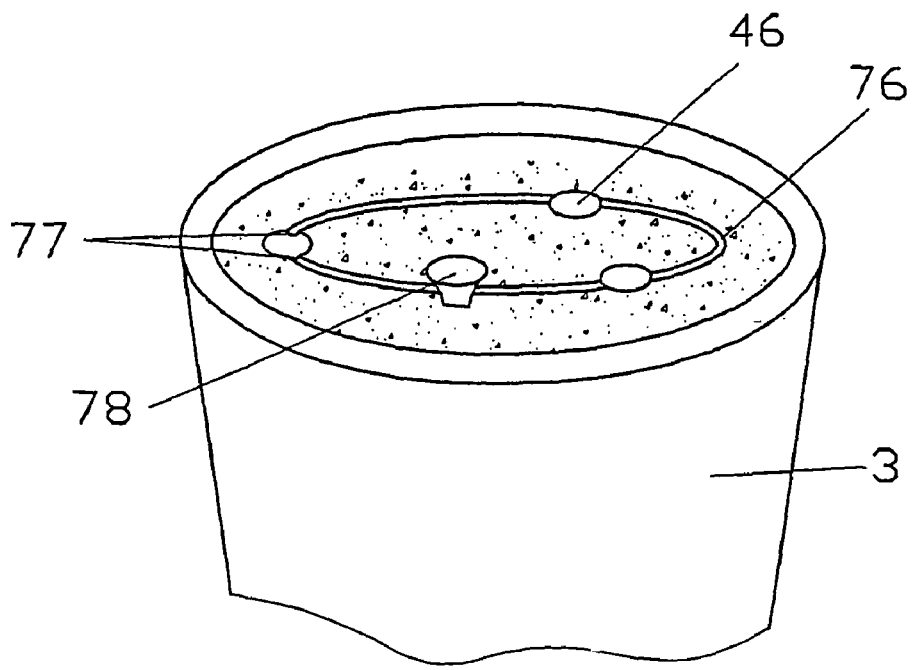
FIG. 18 shows a front view of a planting pot with a watering aid.

FIG. 18 shows a watering aid 76 for use with moulded bodies 46 that are inserted from above. It comprises connections 77 for the attachment of moulded bodies 46. Watering aid 76 is made of an elastic material, so that moulded bodies 46 can be placed on the surface of the content of the planting container in an arrangement as defined by watering aid 76. Subsequently, they are successively thrust into the content of the container, possibly in several passes. Water is supplied through funnel 78, which is also arranged directly above one of moulded bodies 46 in this case. At the same time, the supplied water is effortlessly conducted to the other moulded bodies 46.

An outdoor application of moulded bodies 46 is also possible, particularly in conjunction with the watering aid.

For a further improved effect, moulded bodies 46 are surrounded by a layer of capillary granules 51 in order to achieve an improved distribution of the penetrating water and to additionally counteract silting.

Figure 19:
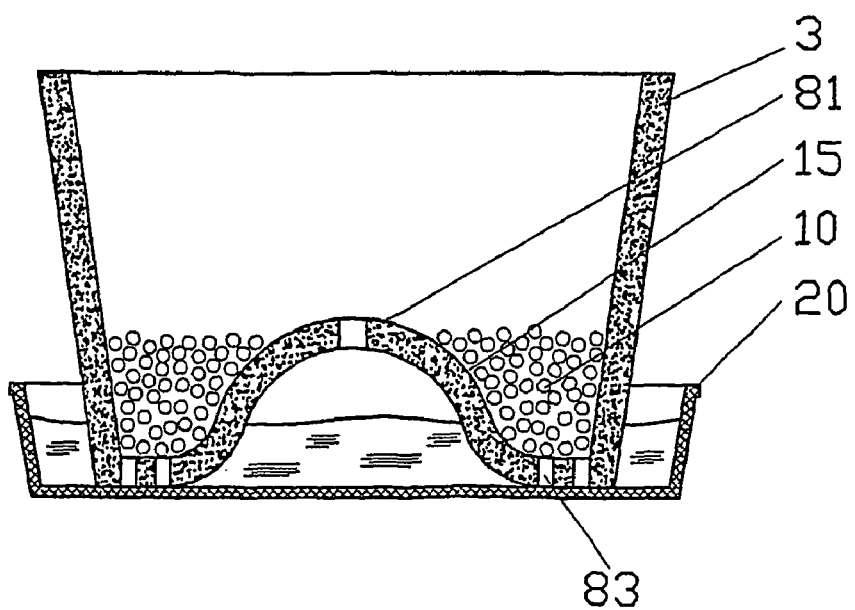
FIG. 19 shows a sectional view of a planting container with an integrated moulded body.
Figure 20:
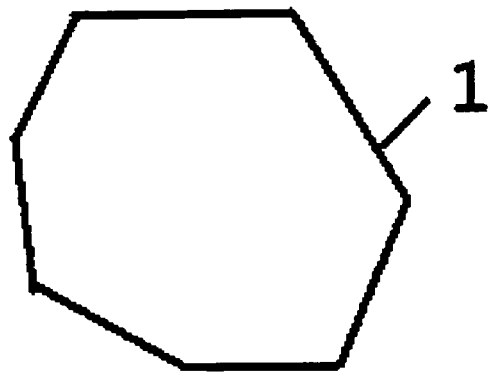
FIGS. 20-24 show plan views of different embodiments of the molded body.

Finally, FIG. 19 shows a planting container 3 where the moulded body is integrated in the container as a moulded portion 81 in the form of a projection 15. The rounded shape similar to an igloo is dictated, inter alia, by technicalities relating to the manufacture of the planting container from clay. The bottom of the container is provided with water drainage holes 83.

In the represented embodiment, the moulded body of the invention is reduced to projection 15. It is however conceivable to design the moulded portion e.g. substantially according to one of the exemplary embodiments of FIGS. 1 and 3 to 11.

The height of projection 15 is preferably equal to ⅕ or ¼ of that of the filling height of the planting container, and to ½ at the most. In bonsai cultures, where shallow planting containers are used, the height of the projection(s) will be nearer to the upper limit or may even be greater.

In summary, projection 15, which is preferably approximately conical or pyramidal in shape and projects into the root ball from above and/or from below, provides a harmonic supply of the roots not only in moisture but also in nutrients and air both at the surface resp. at the bottom of the container and in its interior. Therefore, the moulded bodies of the invention are particularly useful for so-called biological cultures (biologically highly active substrates having a high oxygen demand) and hydrocultures where the moulded bodies furthermore cover the usual water drainage holes at the bottom of the planting containers and thereby prevent the outgrowth of the roots.

From the preceding examples, a large number of modifications are accessible to those skilled in the art without leaving the scope of the invention as defined in the claims, such as, inter alia:
- Manufacture of the projection or of the entire moulded body from capillary rigid expanded plastics, preferably comprising a fine-meshed superficial fleece in order to prevent the ingrowth of roots.
- Reinforcement of the apex of the cone with a cap of stainless steel or plastics material, thereby allowing to pierce the bottom of a planting pot of plastics material.
- A surrounding compensating ring (FIG. 10) made of sponge, e.g. of polyurethane.
- Use of a flexible moulded piece of polyurethane foam instead of a wick extending from the apex of the cone.
- Moulded bodies with incorporated nutrients and additives for providing a long-lasting supply of these substances.
- A planting container having the moulded body integrated in the bottom, e.g. according to FIG. 19, with more than one integrated moulded body (81).
- A moulded body for embedding in the plant substrate having a different shape of the projection, e.g. an essentially cylindrical and/or centrally enlarged shape, to form an enlarged reservoir when used as a watering aid.
- Sieve insert (59) provided with an enlarged rim for covering the edge of the moulded body, thereby preventing moisture supply and evaporation at the upper edge of the moulded body and thus the formation of microflora (algae, etc.), particularly in moulded bodies made of capillary materials.

Figure 21:
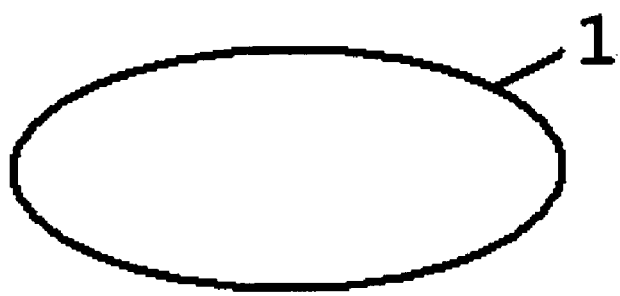
Figure 22:
Figure 23:
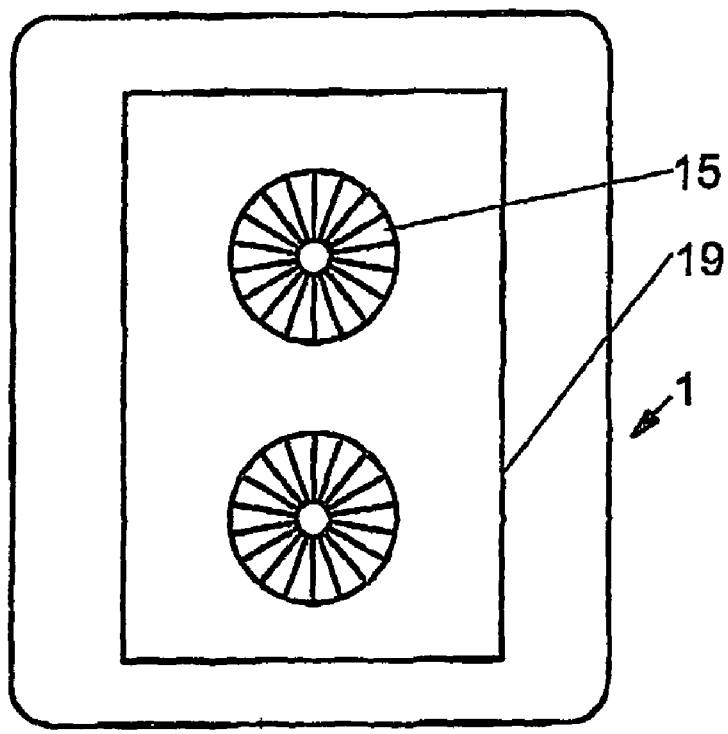

Although an annular base 9 is shown and described with respect to the embodiment of FIGS. 2-6 as a preferred embodiment, additional shaped bases including rectangular as seen in FIGS. 11 and 12 are within the scope of the present invention. These additional shapes may be polygonal as seen in FIG. 21 including rectangular, octagonal, hexagonal, tetragonal, triangular, quadratic; or a closed plane curve as seen in FIG. 22 including round, elliptical and oval; or even irregular shaped or having mixed shapes as seen in FIG. 23.

Figure 24:
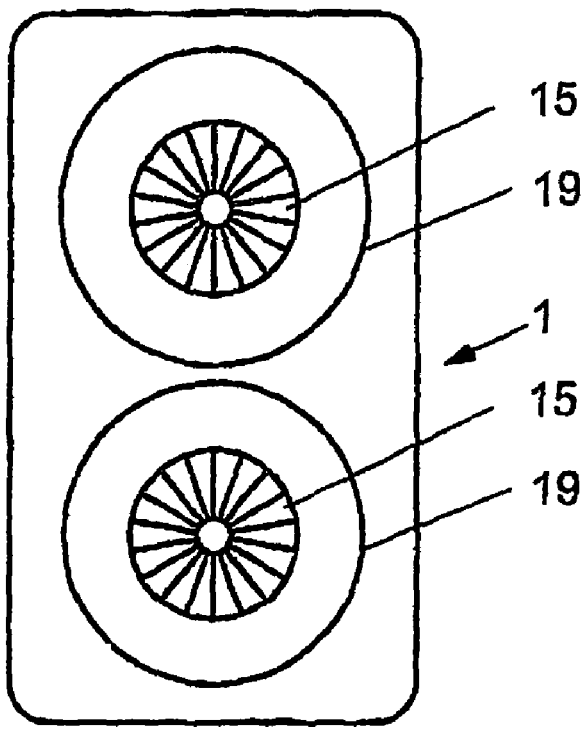

The projection 15 may have a shape corresponding to the base 9 or may have a different shape from the base 9. There may also be more than one projection 15 as seen in FIGS. 23 and 24.

In addition, the ridge 19 and corresponding trough 20 may also have a shape corresponding to the base 9 or different therefrom as well as corresponding to the projection 15 or different therefrom. A single ridge 19 may surround plural projections as seen in FIG. 23 or a respective ridge 19 may surround a corresponding one of plural projections 15 as seen in FIG. 24.

Further, the molded body 1 may be entirely made of a water-permeable material, for example clay, and preferably highly porous clay. The water-permeable material may comprise effective amounts of components increasing the porosity and/or capable of storing liquids such as zeolites. In addition, nutrients and/or additives may be incorporated in the molded body in order to provide a long-term supply of such substances.

Still further, at least the projection 15 may consist of a polymer, water-permeable rigid expanded plastic material. At least the apex 17 of the projection 15 may be covered by a cap of a more resistant material, such as metal or a synthetic material, thereby allowing thin synthetic materials and the plant substrate to be pierced substantially without damaging the projection 15.

I claim:

1. A planting container comprising a molded body integrally formed therewith, the molded body comprising:
    a base having at least one projection formed as one piece with said base, said projection projecting upwardly from said base,
    said projection being tapered from a proximal end to a distal end thereof,
    wherein an entirety of said molded body is made of a water-permeable material for conducting a fluid from said proximal end to said distal end, said molded body being structured and arranged for insertion into said planting container in an operative mode,
    said base having a convex portion that defines a cavity therein, said convex portion facing a direction opposite to that of said projection and being open to said proximal end of said projection, said convex portion forms a fluid reservoir.

2. A planting container comprising a molded body for improving the cultivating conditions of a plant, said molded body including a base having at least one projection formed as one piece with said base, said projection projecting upwardly from said base, said projection being tapered from a proximal end to a distal end thereof,
    wherein an entirety of said molded body is made of a water-permeable material for conducting a fluid from said proximal end to said distal end, said base having a convex portion that defines a cavity therein, said convex portion facing a direction opposite to that of said projection and being open to said proximal end of said projection, said convex portion forms a fluid reservoir, and
    wherein said base of said molded body further comprises a bottom of said planting container.

3. A molded body for improving the cultivating conditions of a plant, comprising:
    a base having at least one projection formed as one piece with said base, said projection projecting upwardly from the base,
    said projection being tapered from a proximal end to a distal end thereof,
    wherein an entirety of said molded body is made of a water-permeable material for conducting a fluid from said proximal end to said distal end,
    said base having a convex portion that defines a cavity therein, said convex portion facing a direction opposite to that of said projection and being open to said proximal end of said projection, said convex portion forms a fluid reservoir, and
    at least one ridge surrounding said at least one projection, so that a trough is defined by said at least one projection and said at least one ridge, wherein the projection is higher than said ridge.

* * * * *